United States Patent [19]
Boissonnat et al.

[11] Patent Number: 6,051,316
[45] Date of Patent: Apr. 18, 2000

[54] SIZING COMPOSITION FOR COMPOSITE YARNS AND COMPOSITE YARNS COATED WITH THIS COMPOSITION

[75] Inventors: Philippe Boissonnat, Challes-les-Eaux; Dominique Loubinoux, La Terrasse, both of France

[73] Assignee: Vetrotex France, Chambery, France

[21] Appl. No.: 08/776,656

[22] PCT Filed: Jun. 6, 1996

[86] PCT No.: PCT/FR96/00851

§ 371 Date: Mar. 25, 1997

§ 102(e) Date: Mar. 25, 1997

[87] PCT Pub. No.: WO96/41912

PCT Pub. Date: Dec. 27, 1996

[30] Foreign Application Priority Data

Jun. 9, 1995 [FR] France .................................. 95 06829

[51] Int. Cl.[7] .................................................. D02G 3/00
[52] U.S. Cl. .......................... 428/378; 428/375; 428/391; 428/392; 428/394; 524/322
[58] Field of Search ..................... 428/364, 375, 428/378, 391, 392, 394; 524/322

[56] References Cited

U.S. PATENT DOCUMENTS

| | | | |
|---|---|---|---|
| 3,044,898 | 7/1962 | Habib et al. | 524/322 |
| 3,423,235 | 1/1969 | Campbell et al. | 428/391 |
| 3,914,499 | 10/1975 | Siefert | 428/392 |
| 4,049,597 | 9/1977 | Motsinger | 428/378 |
| 4,240,944 | 12/1980 | Temple | 428/391 |
| 4,296,173 | 10/1981 | Fahey | 428/378 |
| 5,011,523 | 4/1991 | Roncato et al. | 65/2 |
| 5,316,561 | 5/1994 | Roncato et al. | 65/1 |
| 5,328,493 | 7/1994 | Roncato et al. | 65/1 |
| 5,425,796 | 6/1995 | Loubinoux et al. | 65/442 |
| 5,451,355 | 9/1995 | Boissonnate et al. | 264/136 |
| 5,454,846 | 10/1995 | Roncato et al. | 65/381 |

*Primary Examiner*—William Krynski
*Assistant Examiner*—J. M. Gray
*Attorney, Agent, or Firm*—Oblon, Spivak, McClelland, Maier & Neustadt, P.C.

[57] ABSTRACT

Composite yarn comprising an intimate mixture of glass filaments and thermoplastic filaments, wherein said composite yarn is coated with an aqueous sizing composition containing at least one additive in the form of a fatty acid ester; and the aqueous sizing composition per se.

14 Claims, 2 Drawing Sheets

SIZING COMPOSITION FOR COMPOSITE YARNS AND COMPOSITE YARNS COATED WITH THIS COMPOSITION

BACKGROUND OF THE INVENTION

1. Field of the Invention

The present invention relates to a sizing composition for composite yarns and to composite yarns coated with this composition.

2. Discussion of the Background

Composite yarns (also called hybrid yarns) are yarns composed of organic filaments and glass filaments and are used for the production of composite products. These yarns are mainly obtained by combining together glass filaments and thermoplastic filaments directly under the die so as to obtain good mixing ("intimate" mixing) of glass filaments and thermoplastic filaments. The processes for obtaining composite yarns directly at the die are specially described in Patents EP-A-O 367 661 (U.S. Pat. No. 5,011,523), EP-A-O 505 275 (U.S. Pat. No. 5,328,493), EP-A-O 505 274 (U.S. Pat. No. 5,316,561), WO 93/15893, EP-A-O 599 695 and EP-A-O 616 055. Before combining together the glass filaments and thermoplastic filaments under the die, the glass filaments are coated with a sizing composition intended, especially, to protect the yarns from abrasion. This sizing composition is usually an aqueous composition (it generally contains more than 90% by weight of water), the aqueous compositions being easier to handle and conventionally suitable for coating glass filaments (this type of composition especially having a very high wetting power with respect to glass filaments).

However, thermoplastics have little or no affinity with water and their hydrophobic nature leads to a phenomenon of repulsion between the sized glass filaments and the thermoplastic filaments. This phenomenon is accentuated during the drying which is generally carried out on composite yarns in the case of use of an aqueous sizing composition (in particular, drying enables the composite yarns to be used more easily in conversion processes, such as extrusion processes). The glass filaments then tend to group together as the water progressively evaporates, the thermoplastic filaments being ejected to the outside of the composite yarn. Instead of obtaining the desired intimate mixing of glass filaments and thermoplastic filaments within the composite yarns, a segregation of the thermoplastic filaments is therefore observed, with partial or complete lack of cohesion of the hybrid yarn, the thermoplastic filaments in particular ending up without any protection from the risks of abrasion or electrostatic phenomena.

The segregation of the thermoplastic filaments and their absence of protection from abrasion pose problems, in particular when using the composite yarns in textile applications, for example in weaving in which the yarns rub on feed rollers. In such cases, the composite yarns coated with aqueous size tend to break and to disrupt the running of the textile machines. The poor mixing between the glass filaments and thermoplastic filaments, associated with the segregation resulting from the use of a conventional aqueous sizing composition, is moreover observed in composites obtained from composite yarns comprising the said glass filaments and the said thermoplastic filaments, these composites not having a very satisfactory surface appearance.

SUMMARY OF THE INVENTION

The object of the present invention is to remedy the previously mentioned problems. This object is achieved by using a suitable sizing composition in order to coat the glass filaments before they are combined together with the thermoplastic filaments, this composition for composite yarns comprising a base mixture and at least one additive in the form of a fatty acid ester.

By "base mixture" is meant, according to the invention, any aqueous sizing composition usually used for the coating of glass filaments under the die, this composition usually being in the form of an aqueous solution, an aqueous emulsion or an aqueous suspension. Examples of "base mixtures" will be given later.

The present invention also relates to the composite yarns which are coated with the sizing composition according to the invention and are obtained directly under the die, these composite yarns having improved properties compared to composite yarns obtained under the die using conventional sizes.

DETAILED DESCRIPTION OF THE PREFERRED EMBODIMENTS

The sizing composition according to the invention meets the requirements of sizing compositions which have to coat glass filaments as they are being drawn down at the die; it is homogeneous and stable, especially at the die, and it withstands the shearing induced by the filaments passing through at high speed. In addition, the composition according to the invention wets the surface of the glass filaments at high drawing speeds well and allows good lubrication of the glass filaments, thus protecting them from abrasion.

The composition according to the invention furthermore has very good wetting power, not only with respect to the glass filaments but also with respect to the thermoplastic filaments. The sizing composition deposited on the glass filaments can therefore migrate partly along the thermoplastic filaments after the two types of filament have come into contact. The size is thus distributed uniformly over the entire composite yarn obtained, the glass filaments and thermoplastic filaments being perfectly wetted by the composition.

The thermoplastic filaments within the composite yarns coated with the composition according to the invention are lubricated and protected from abrasion and show little capacity for becoming electrostatically charged, like the glass filaments. Good mixing of the glass filaments and thermoplastic filaments and cohesion of the said filaments are also observed within the composite yarns.

The advantages of the composite yarns coated with the composition according to the invention are manifold: such yarns are particularly suited to being woven without the risk of breakages and the impregnation of such yarns by an organic material is improved. The composites obtained from the composite yarns, optionally combined with an additional organic material, have a highly satisfactory surface appearance, better than that of composites obtained in the same way but using composite yarns coated with conventional sizes, the mechanical properties of composites obtained using the yarns according to the invention being just as good as the mechanical properties of composites obtained using conventional composite yarns.

The composition according to the invention may comprise, as base mixture, any conventional aqueous sizing composition, the base mixture being conventionally chosen by those skilled in the art from the known compositions, depending in particular on the type of thermoplastic filaments which are combined with the glass filaments, on the application of the composite yarn coated with the composition and on the organic materials which are to be combined with the said yarn.

In general, the base mixture of the composition according to the invention comprises at least 85%, and preferably at least 90%, by weight of water and comprises at least one compound acting as a coupling agent. According to one embodiment of the invention, the base mixture thus comprises at least one coupling agent, such as a silane, a titanate, etc., enabling the sizing composition to bond onto the glass. The base mixture may also comprise other coupling agents making it possible, after drying the yarns coated with the sizing composition, to improve the bonding between glass and combined organic material and, in particular, one or more "coupling co-agents" acting in a complementary manner to that of the aforementioned coupling agent or agents and allowing, for example, the creation of interactions between the coupling agent or agents and the combined organic material. In particular, in the case in which the composite yarns according to the invention consist of glass filaments and polyolefin-type thermoplastic filaments, and in the case in which they are intended to reinforce polyolefin materials, the base mixture may comprise, in emulsion form, one or more polyolefins of a kind similar to the polyolefins of which the thermoplastic filaments and/or the material to be reinforced are composed, the polyolefins of the emulsion contributing to the coupling between glass and material to be reinforced.

The base mixture of the composition according to the invention may also comprise one or more neutralizing agents and/or stabilizers, or any other type of agent conventionally used in sizing compositions for composite yarns.

According to advantageous embodiments of the present invention, in the case in which the composite yarns according to the invention comprise polyolefin (more particularly polypropylene) filaments and in the case in which they are intended to reinforce a polyolefin (more particularly polypropylene) material, the base mixture of the composition according to the invention coating the said yarns comprises at least one silane-type, preferably aminosilane-type, coupling agent enabling the composition to bond onto the glass, at least one polyolefin (respectively polypropylene) coupling co-agent grafted by at least one acid or acid anhydride, and preferably by at least one maleic anhydride, having a complementary role to that of the silane-type coupling agent and enabling the bonding between glass and polyolefin (respectively polypropylene) to be improved, and at least one neutralizing agent or stabilizer making it possible to neutralize, temporarily, and until drying, the grafting functional groups of the polyolefin (respectively polypropylene) coupling agent or to stabilize the base mixture.

By way of example, the abovementioned silane may be a γ-aminopropyltriethoxysilane or an N-2-aminoethyl-γ-aminopropyltriethoxysilane and the neutralizing agent or stabilizer may be an inorganic or organic base (sodium hydroxide, potassium hydroxide, aqueous ammonia or a primary, secondary or tertiary amine, etc.).

The sizing composition according to the invention comprises, in addition to the base mixture, at least one additive in the form of a fatty acid ester. Preferably, this additive is an alkoxylated fatty acid ester and advantageously it comprises one or more hydroxyl functional groups. By way of example, this additive may be an ethoxylated fatty acid ester with hydroxyl functional groups.

The amount of additive(s) in the form of fatty acid ester(s) in the composition is generally from 1 to 15% by weight and advantageously from 1 to 10% by weight with respect to the base mixture. Preferably, it is from 1 to 8% by weight and particularly preferably it is from 1 to 6% by weight with respect to the base mixture. This or these additives may be added during the compounding of the base mixture or they may be added more simply to the already-compounded base mixture.

It should be noted that the neutralizing agent (or stabilizer) mentioned previously may also serve to neutralize the alcohol functional groups of the added fatty acid ester, in particular to prevent the reaction of the alcohol functional groups of the ester with the amine functional groups of the silane when the silane used is an aminosilane. In this case, when the base mixture used comprises a neutralizing agent (or stabilizer), the quantity by weight of neutralizing agent in the composition according to the invention is optionally increased with respect to the initial quantity of neutralizing agent in the base mixture so as to allow both the desired neutralization within the base mixture (for example the neutralization of the polyolefin coupling agent in the previously mentioned embodiment) and that of the fatty acid ester.

The fatty acid ester may also be neutralized by a neutralizing agent (or stabilizer) which is different from that used as the case may be in the base mixture, this additional neutralizing agent being added during the compounding of the composition according to the invention.

According to preferred embodiments of the present invention, in which the composite yarns comprise polypropylene (and more generally polyolefin) filaments and/or in which the composite yarns are intended to reinforce a polypropylene (respectively polyolefin) material, the composition according to the invention coating the said yarns comprises a base mixture consisting of 0.05 to 3% by weight, and advantageously 0.1 to 1.5% by weight, of a silane-type coupling agent, 1 to 10% by weight of a polypropylene (respectively polyolefin) coupling agent grafted by at least one acid or anhydride and 0.1 to 5%, and advantageously 0.2 to 1.5%, by weight of a neutralizing agent or stabilizer, the composition comprising, in addition to this base mixture, a fatty acid ester added in an amount from 1 to 10%, advantageously from 1 to 6%, by weight with respect to the base mixture and, optionally, an additional neutralizing agent which may or may not be identical to that already present in the base mixture and in a quantity sufficient to neutralize the fatty acid ester.

The composite yarns according to the invention are obtained in particular according to the following process: streams of molten glass are drawn into the form of fans of continuous filaments from the orifices of one or more dies and the filaments are coated with the sizing composition according to the invention (that is to say of the composition comprising a base mixture to which a fatty acid ester has been added) with the aid of one or more coating devices, such as sizing rollers, while simultaneously a thermoplastic organic material is extruded and entrained, the paths followed by the glass filaments and by the thermoplastic filaments converging on each other before the said filaments are combined together into a mechanically entrained composite yarn.

The composite yarns according to the invention may also be obtained according to any one of the processes described in Patents EP-A-O 367 661, EP-A-O 505 275, EP-A-O 505 274, WO 93/15893, EP-A-O 599 695 and EP-A-O 616 055.

By extension, by "composite yarns coated with a sizing composition" are meant "yarns composed of organic filaments and of glass filaments which have been coated with a sizing composition", that is to say not only the composition-coated yarns obtained after combining together the organic filaments and the sized glass filaments but also these same yarns after drying and/or after other Treatments which are intended to remove certain components from the composition (especially water) and/or to polymerize certain components of the composition.

The composite yarns according to the invention may be collected in the form of continuous yarns or tapes, or may be cut either directly under the die by a device serving to entrain them mechanically or subsequently from the wound packages of continuous yarns obtained, etc. Thus, the presentation of the composite yarns varies depending on their application.

The quantity of size deposited on the composite yarns according to the invention is about 0.2 to 5% by weight, and preferably 0.2 to 3% by weight, with respect to the yarns. These yarns are subjected to drying before they are combined at all with an organic material to be reinforced.

As indicated previously, the composite yarns according to the invention are particularly suited to weaving as well as to the production of composites, whether or not they are combined with an additional organic material. The composites may in particular be obtained by supplying an extruder using the composite yarns according to the invention, as described in Patent Application EP-A-0 541 441.

The sizing composition for composite yarns and the composite yarns according to the invention will be more clearly understood through the following examples illustrated by the figures, such that:

Figure 1A:
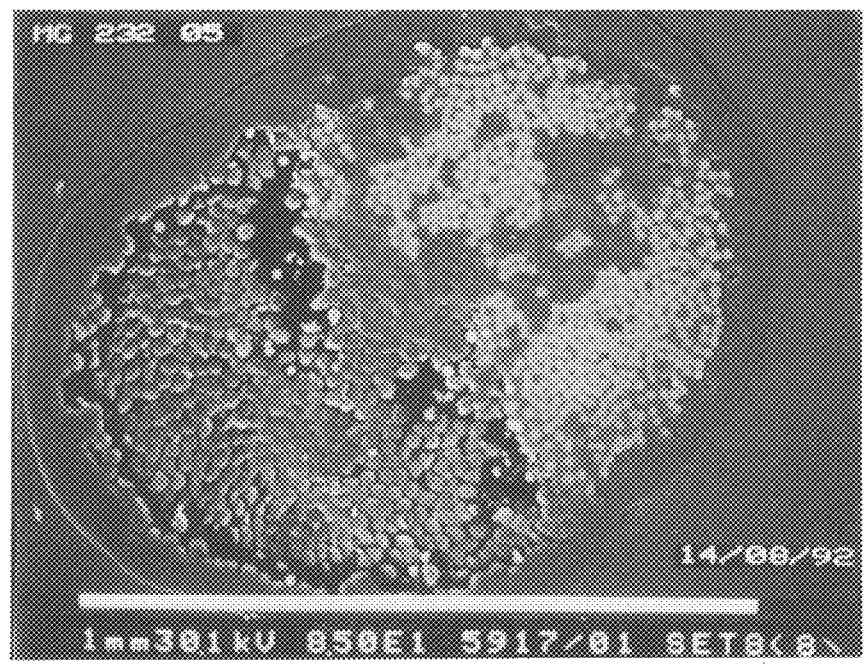
FIG. 1a shows an electron microscope photograph of a cross-section of a conventional composite yarn and FIG. 1b shows a slightly simplified diagram of the said photograph.

REFERENCE EXAMPLE 800 glass filaments of 17 μm in diameter, obtained by drawing molten E-glass from a die, coated using a graphite sizing roller with a sizing composition ordinarily used for composite yarns consisting of polypropylene filaments and glass filaments, are combined with 800 polypropylene filaments of 23 μm in diameter, these two types of filament being combined together into one yarn (or "roving") which is wound in the form of a straight-sided wound package.

The polypropylene filaments are formed by extruding a product, marketed under the reference "VM 6100 K" by Shell, to which has been added a coupling agent, marketed under the reference "Polybond 3002" by Uniroyal Chemical, in a proportion of 4% by weight with respect to the polypropylene.

The sizing composition deposited on the glass filaments comprises approximately 1% by weight of an aminosilane, approximately 0.5% by weight of a neutralizing agent of the amine type, approximately 13% by weight of an emulsion of polypropylene grafted by a maleic anhydride, this emulsion containing approximately 55% of water. The total quantity of water in this size is approximately 93%.

On the filaments, glass or polypropylene, of which the composite yarn is composed, the angle of contact with the size used is measured on a mono-filament with a Khan balance. The results are given in the appended Table I.

Friction tests are also carried out on the hybrid yarn obtained, by passing the yarn over 3 steel bars 8 mm in diameter at a speed of 100 m/min and at an input tension $F_1$ of the order of 120 cN. The output tension $F_2$ of the yarn is measured and the coefficient of friction $\mu$ is determined from the formula: $F_2 = F_1 e^{(\mu\alpha)}$, $\alpha$ being the sum of the angles of contact of the yarn on the bars (in this case about 370°). The results are given in the appended Table II.

A Rotschild test on a Rotschild R 4021 electrostatic voltmeter is also carried out on the yarn at 60% relative humidity and at 20° C., in order to evaluate the capacity of the yarn to be electrostatically charged. The yarn is charged between 2 electrodes (150 V) and the measured half discharge times are given in the appended Table II.

The mechanical properties of the composites, obtained by injection moulding granulated fibres 12 mm in length produced from the hybrid yarn previously obtained, are also measured. The tensile and flexural strengths, and the unnotched Charpy and notched Izod impact strengths are measured under the conditions defined respectively by the Standards ISO R 527, ISO R 178, ISO R 179 and ISO R 180 and are given in the appended Table III.

The composite yarn obtained is moreover passed through a jacketing nozzle so as to hold the yarn with a view to cutting it. The jacketed yarn is then immersed in a thermosetting resin and placed in a vacuum in order to remove the bubbles before cutting and polishing operations for the purpose of taking an electron microscope photograph of the cross-section of the yarn.

Figure 1B:
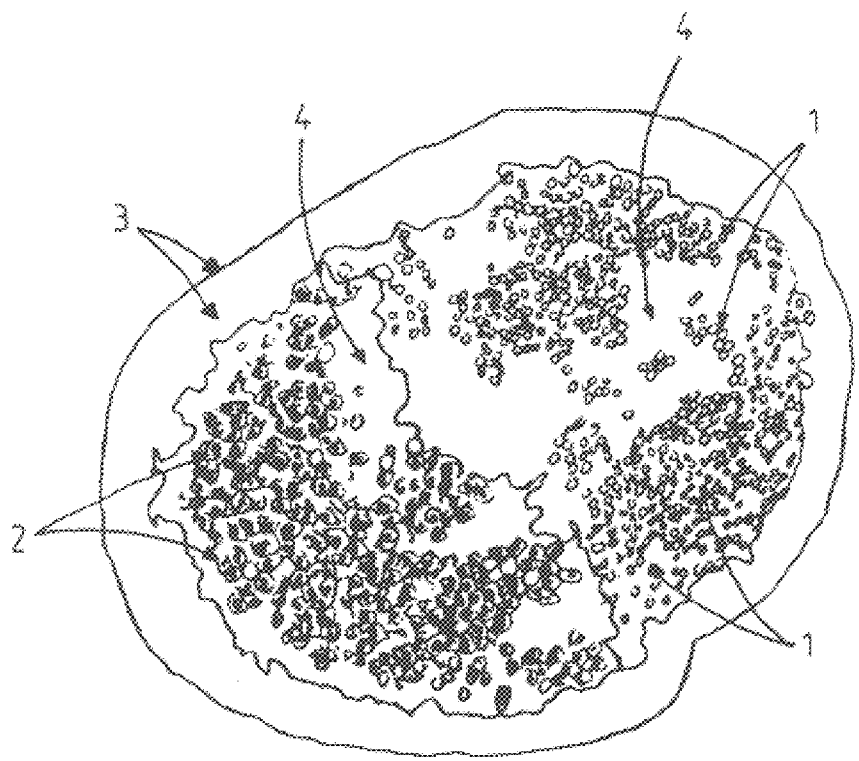

FIG. 1a illustrating the photograph obtained shows the distribution of the various filaments within the composite yarn in the present example. According to FIG. 1b, which constitutes a simplified diagram of the cross-section shown in FIG. 1a and bearing the reference numbers (FIG. 1a not bearing the reference numbers for the sake of clarity), the composite yarn comprises glass filaments 1 and polypropylene filaments 2, the yarn being surrounded by a jacket 3 and having, at certain places, traces of a thermosetting impregnation resin 4 (the jacket and the resin being only for the requirements of the photography). From the photograph and the representation of it, a major segregation of the thermoplastic filaments within the reference composite yarn is observed.

EXAMPLE 1

The same procedure is carried out as in the reference example, with the addition to the sizing composition of 3% by weight of an ethoxylated fatty acid ester with hydroxyl groups, this product being marketed under the reference "Ensital PRF 416" by Sidobre Sinova.

The results of the various tests are given respectively in the appended Tables I, II and III.

Figure 2A:
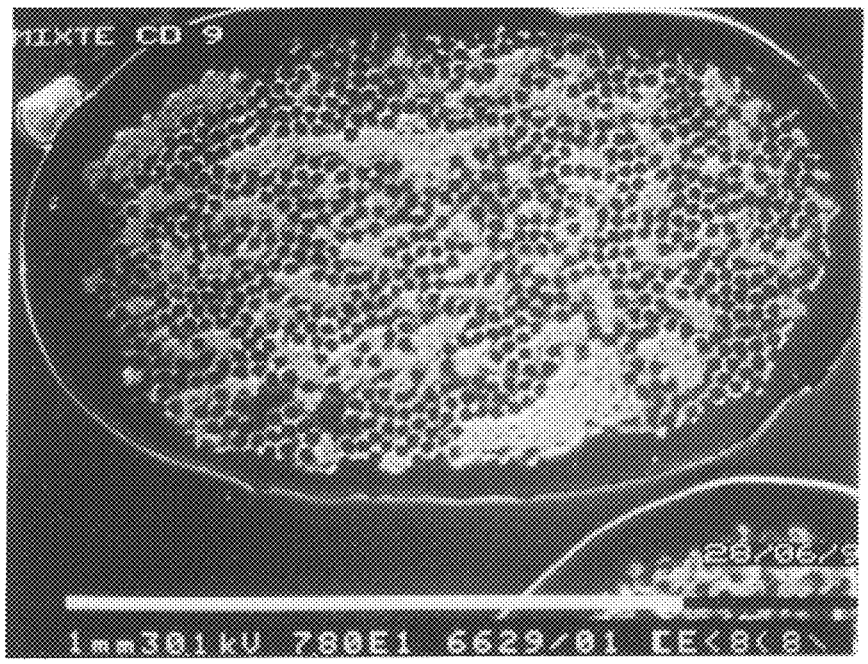
FIG. 2a shows an electron microscope photograph of a cross-section of a composite yarn according to the invention and FIG. 2b shows a slightly simplified diagram of the said photograph.
Figure 2B:
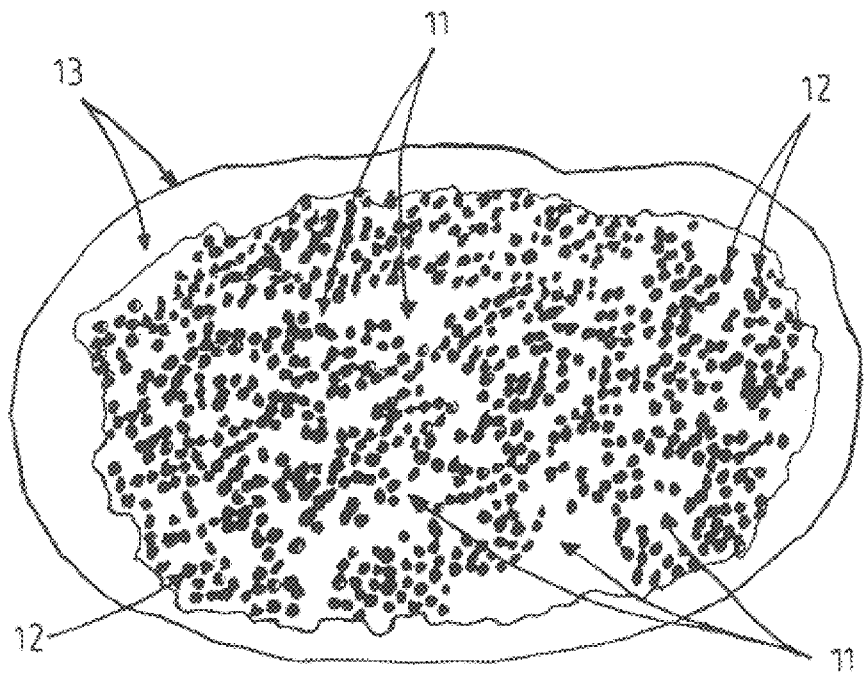

FIG. 2a illustrates the photograph, taken as in the reference example, of the cross-section of the yarn obtained. Quite homogeneous mixing ("intimate" mixing) is observed between the glass filaments 11 (corresponding to the white parts in FIGS. 2a and 2b) and the thermoplastic filaments 12 (black points) within the yarn. This yarn is surrounded by a jacket 13 for the requirements of the photography, as in the reference example.

EXAMPLE 2

The same procedure is carried out as in Example 1, adding 6% by weight of Ensital PRF 416 to the sizing composition.

The results of the various tests are given in the appended Tables II and III.

From Table I, it may be observed that the conventional sizing composition used in the reference example wets the glass very well and the polypropylene very poorly. It therefore tends to remain on the glass filaments. As regards the sizing compositions according to the invention which are used in Examples 1 and 2, they wet the glass very well and the polypropylene very well. There is therefore transfer of part of the composition deposited on the glass filaments to the polypropylene filaments. This transfer takes place by contact between glass filaments and polypropylene filaments.

From Table II, it may also be observed that the use of a sizing composition according to the invention results in a reduction in the coefficient of friction, depending on the concentration of ethoxylated fatty acid ester in the composition. In addition, when the yarn according to the reference example is used as the warp yarn on a loom in order to manufacture a woven fabric, deposits of fluff are formed and build up on the healds of the loom and result in a stoppage of the loom every 20 to 50 meters of woven yarn. In contrast, the yarns according to Examples 1 and 2 give rise to no deposition and an entire warp of several thousands to tens of thousands of meters of these yarns may be used without the loom stopping.

A very significant reduction may also be observed in the capacity for the yarns according to Examples 1 and 2 to be electrostatically charged, compared to the yarn according to the reference example.

Finally, it may be observed that the mechanical properties of the composites obtained from the yarns according to Examples 1 and 2 are just as good as the mechanical properties of the composites obtained from the yarns according to the reference example. The same observation may be made irrespective of the method of production of the composites from the composite yarns; thus, for composites produced from sheets of fabrics woven from composite yarns, the mechanical properties of the composites produced from the yarns according to the invention are at least as good as the mechanical properties of the composites produced from the conventional composite yarns.

The sizing composition according to the invention is suitable for any type of composite yarn: glass/polyamide, glass/polyester, etc., and the composite yarns coated with size according to the invention may serve for textile applications or may be used directly in order to produce composites by moulding, injection moulding, etc.

TABLE I

|  | Reference Example | | Example 1 | |
|---|---|---|---|---|
|  | Glass filaments | Polypropylene filaments | Glass filaments | Polypropylene filaments |
| Angle of contact | 0° | 45° | 14° | 20° |

TABLE II

|  | Coefficient of friction | Half discharge time(s) |
|---|---|---|
| Reference Example | 0.44 | 40 to 60 |
| Example 1 | 0.36 | 9 |
| Example 2 | 0.34 | 9 |

TABLE III

|  | Tensile strength (MPa) | Flexural strength (MPa) | Unnotched Charpy impact strength (kJ/m$^2$) | Notched Izod impact strength (J/m) |
|---|---|---|---|---|
| Reference Ex. | 139.3 | 214 | 71 | 66 |
| Example 1 | 138 | 210 | 73 | 70 |
| Example 2 | 137 | 215.5 | 70.5 | 63 |

We claim:

1. Composite yarn comprising an intimate mixture of glass filaments and thermoplastic filaments, wherein said composite yarn is coated with an aqueous sizing composition comprising a base mixture and at least one additive in the form of an alkoxylated fatty acid ester comprising one or more hydroxyl functional groups.

2. Composite yarn according to claim 1, wherein the amount of additive(s) in the form of fatty acid ester(s) in the sizing composition is between 1 and 15% by weight with respect to the base mixture.

3. Composite yarn according to claim 1, wherein the base mixture of the sizing composition comprises at least 85% by weight of water and at least one coupling agent.

4. Composite yarn according to claim 1, wherein the sizing composition comprises at least one polyolefin.

5. Composite yarn according to claim 4, wherein the sizing composition comprises at least one polypropylene grafted by at least one acid or acid anhydride.

6. Composite yarn according to claim 1, wherein the sizing composition comprises at least one neutralizing agent or stabilizer.

7. Composite yarn according to claim 1, wherein the composite yarn has a loss on ignition of between 0.2 and 5% by weight.

8. Composite yarn according to claim 1, wherein the amount of additive(s) in the form of fatty acid ester(s) in the sizing composition is a segregation-reducing effective amount.

9. Composite based on organic material(s) and on glass, wherein the composite comprises, at least in part, composite yarns according to claim 1.

10. Aqueous sizing composition for composite yarns, containing at least one additive in the form of an alkoxylated fatty acid ester comprising one or more hydroxyl functional groups.

11. Composite yarn comprising an intimate mixture of glass filaments and thermoplastic filaments, wherein said composite yarn is coated with an aqueous sizing composition containing at least one additive in the form of a fatty acid ester, wherein the fatty acid ester is an alkoxylated fatty acid ester comprising one or more hydroxyl functional groups.

12. Composite yarn according to claim 11, wherein the amount of additive(s) in the form of fatty acid ester(s) in the sizing composition is a segregation-reducing effective amount.

13. Composite yarn comprising an intimate mixture of glass filament and thermoplastic filaments, wherein said composite yarn is obtained by coating the glass filaments with an aqueous sizing composition containing at least one additive in the form of an alkoxylated fatty acid ester comprising one or more hydroxyl functional groups to form coated glass filaments, and then intimately mixing said coated glass filaments with said thermoplastic filaments, wherein said sizing composition is distributed over the composite yarn.

14. Composite yarn according to claim 13, wherein the amount of additive(s) in the form of fatty acid ester(s) in the sizing composition is a segregation-reducing effective amount.

* * * * *

UNITED STATES PATENT AND TRADEMARK OFFICE
CERTIFICATE OF CORRECTION

PATENT NO. : 6,051,316
DATED : April 18, 2000
INVENTOR(S) : Philippe Boissonnat, et al.

It is certified that error appears in the above-identified patent and that said Letters Patent is hereby corrected as shown below:

Column 4, line 61, "Treatments" should read --treatments--.

Column 8, line 48, "glass filament" should read --glass filaments--.

Signed and Sealed this

Eighth Day of May, 2001

*Attest:*

NICHOLAS P. GODICI

*Attesting Officer*   Acting Director of the United States Patent and Trademark Office